…

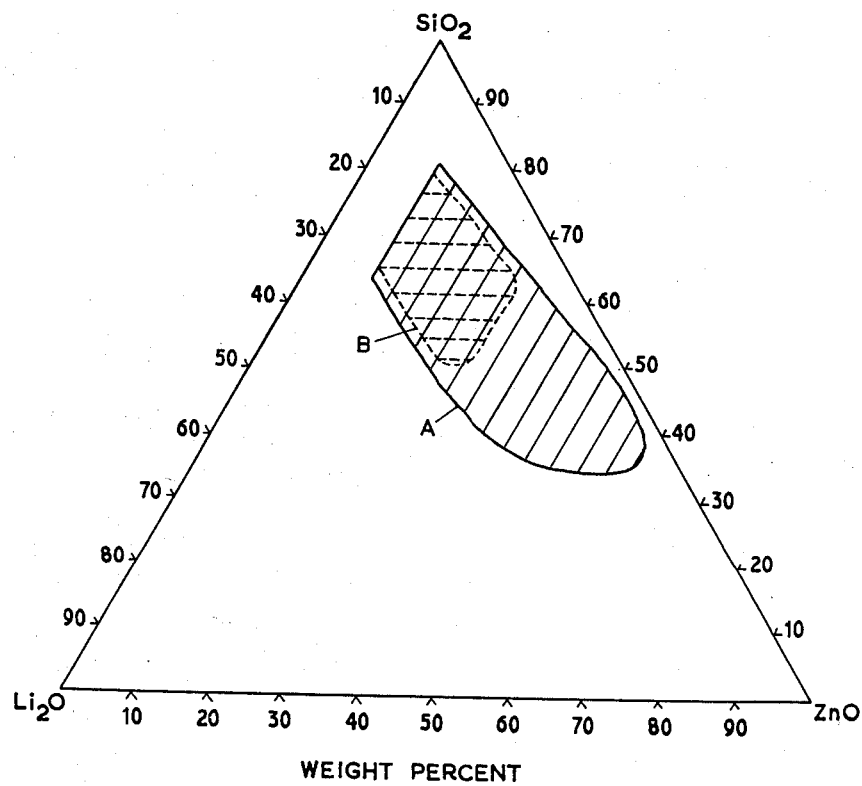

United States Patent Office 3,170,805
Patented Feb. 23, 1965

3,170,805
CERAMICS AND THEIR PRODUCTION
Peter William McMillan and Graham Partridge, Stafford, England, assignors to The English Electric Company Limited, London, England, a British company
Filed Feb. 20, 1961, Ser. No. 90,414
Claims priority, application Great Britain, Feb. 29, 1960, 7,086/60
9 Claims. (Cl. 106—39)

This invention relates to ceramic materials of the kind formed from a heat-sensitive glass by controlled devitrification thereof.

Conventional fired ceramics suffer from the disadvantage that the shrinkage of the material during drying and firing cannot be closely controlled. The manufacture of fired ceramic articles to close dimensional tolerances has thus involved machining the fired ceramic articles.

Recently, new ceramic materials have been developed, formed from heat-sensitive glasses by controlled devitrification thereof. Such materials are described in British Patent No. 752,243 (Corning) and in U.S. patent application Serial Number 42,808, filed July 14, 1960, now abandoned, and continuation-in-part application Serial Number 365,619, filed May 7, 1964, in the name of the present applicants.

These new ceramic materials offer certain advantages over conventional fired ceramics, since moulding and shaping techniques known in glass manufacture can be applied to the glass articles before devitrification. The dimensions of the final ceramic articles can thereby be held within close limits. Furthermore, such ceramic materials have substantially zero porosity, high mechanical strength, good resistance to thermal shock and high electrical resistance. The materials are hard and are generally resistant to deformation up to temperatures of about 950° C.

In British Patent No. 752,243 there is described a heat-sensitive glass, the major constituents of which lie in the system $Li_2O$—$Al_2O_3$—$SiO_2$. The range of compositions by weight described is as follows:

| | Percent |
|---|---|
| $SiO_2$ | 60–85 |
| $Al_2O_3$ | 2–25 |
| $Li_2O$ | 5.5–15 |

The ratio $Al_2O_3:Li_2O$ should be less than 1.7:1.

The major constituents (silicon dioxide, aluminium oxide, and lithium oxide) should total at least 90 percent of the glass. The remaining 10 percent of the glass may be made up of various non-essential constituents which take part in the glassy matrix of the ceramic bodies together with residual $SiO_2$ and $Al_2O_3$. The nature of the non-essential constituents and the amounts by weight which are permissible are as follows:

(i) $Na_2O$ and $K_2O$: not greater than 4% either alone or combined.
(ii) ZnO, SrO, BaO, PbO: not greater than 5% either individually or collectively.
(iii) MgO and CaO: not greater than 10%.
(iv) $B_2O_3$: not usually greater than 5% but may be up to 10% when the $Li_2O$ content is near its maximum.

In the composition of a heat-sensitive glass, it is essential to include a material which is present as submicroscopic particles to act as nucleating centres which will initiate the growth of crystallites. In the process described in British patent specification No. 752,243, a proportion of a metal was used for nucleation purposes, selected from the group consisting of 0.001 to 0.03 percent of gold computed as Au, 0.001 to 0.03 percent of silver computed as AgCl, and 0.001 to 1 percent of copper computed as $Cu_2O$.

According to one feature of the invention described in patent applications Serial Numbers 42,808 and 365,619, there is described a heat-sensitive glass, the major constituents of which lie in the system $$Li_2O—MgO—Al_2O_3—SiO_2$$

The range of compositions by weight described is as follows:

| | Weight percent |
|---|---|
| $Li_2O$ | 0–27.0 |
| MgO | 0–32.0 |
| $Al_2O_3$ | 0–36.0 |
| $SiO_2$ | 45.0–88.0 |

In addition to the above major constituents, which should total at least 90% of the composition, various constituents of secondary importance could be present as follows:

(i) Alkali metal oxides ($Na_2O$ and $K_2O$) up to 5 weight percent either alone or combined.
(ii) Zinc oxide (ZnO) up to 10 weight percent.
(iii) Calcium oxide (CaO) up to 5 weight percent.
(iv) Boric oxide ($B_2O_3$) up to 10 weight percent.

According to one aspect of the invention described in patent application Serial Number 42,808, filed July 14, 1960, now abandoned, and continuation-in-part application Serial Number 365,619, filed May 7, 1964, nucleation of a heat-sensitive glass is provided by phosphate ions.

According to the present invention, a ceramic material is formed by controlled devitrification of a heat-sensitive glass, the major constituents of which lie in the system $Li_2O$—ZnO—$SiO_2$. A glass of this composition is distinguished from a glass of any of the compositions described above, in which zinc oxide is present optionally as one of various non-essential constituents.

The proportions by weight of these major constituents, which make up at least 90 percent by weight of the total composition, are as follows:

| | Percent |
|---|---|
| $Li_2O$ | 2.0–27.0 |
| ZnO | 10.0–59.0 |
| $SiO_2$ | 34.0–81.0 |

This range of compositions is shown by the enclosed area A in the accompanying drawing.

A preferred range of compositions is as follows:

| | Percent |
|---|---|
| $Li_2O$ | 7.0–25.0 |
| ZnO | 10.0–30.0 |
| $SiO_2$ | 50.0–79.0 |

This range of compositions is shown by the enclosed area B in the accompanying drawing.

In addition to the above major constituents, certain constituents of secondary importance may also be present. The nature and proportions of these are as follows:

(i) Alkali metal oxide ($Na_2O$ and $K_2O$ up to 5 weight percent either alone or combined.
(ii) Aluminium oxide ($Al_2O_3$) up to 10 weight percent.
(iii) Magnesium oxide (MgO) up to 10 weight percent.
(iv) Calcium oxide (CaO) and barium oxide (BaO) up to 5 weight percent either alone or combined.
(v) Boric oxide ($B_2O_3$) up to 10 weight percent.
(vi) Lead oxide (PbO) up to 5 weight percent.

Either phosphates or metallic nucleating agents, for example, gold, silver or copper may be used in glass compositions in the whole of the present range. These heat-sensitive glasses can then be converted by suitable heat-treatment into satisfactory ceramics. The phosphate nucleating agent is added in such quantity that the quantity of phosphate anions introduced into the resultant glass corresponds to 0.5 to 6.0 percent by weight of phosphorus pentoxide ($P_2O_5$). The metallic nucleating agent is selected from the group consisting of 0.02 to 0.03 percent of gold computed as Au, 0.02 to 0.03 percent of silver computed as AgCl, and 0.5 to 1.0 percent of copper computed as $Cu_2O$.

A description will now be given, by way of example, of the preparation of a number of heat-sensitive glasses and the manner of their controlled devitrification into ceramic materials according to the present invention. There then follows a description of the physical properties of the resultant ceramic materials and examples of their use.

(a) *Preparation of the heat-sensitive glasses.*—For the preparation of the glasses, the following batch materials are used for the major constituents:

Lithium carbonate, $Li_2CO_3$
Zinc oxide, ZnO
Ground quartz, $SiO_2$ and for the secondary constituents:

Sodium carbonate, $Na_2CO_3$
Sodium nitrate, $NaNO_3$
Potassium carbonate, $K_2CO_3$
Potassium nitrate, $KNO_3$
Aluminium oxide, $Al_2O_3$
Aluminium hydroxide, $Al(OH)_3$
Magnesium oxide, MgO
Calcium carbonate, $CaCO_3$
Barium carbonate, $BaCO_3$
Boric acid, $H_3BO_3$
Lead oxide, PbO or $Pb_3O_4$ The batch materials are thoroughly mixed before melting. As a further constituent of the batch, a suitable quantity of a nucleating agent is added. For glasses nucleated with phosphate anions, the phosphate of a metal is added, so that the quantity of phosphate anions introduced into the resultant glass corresponds with 0.5 to 6.0 percent by weight of phosphorus pentoxide. The phosphate may be added as the orthophosphate of a metal occurring in the glass composition, the preferred phosphates being:

Lithium orthophosphate, $Li_3PO_4$
Zinc orthophosphate, $Zn_3(PO_4)_2$

The orthophosphates of sodium, potassium aluminium and magnesium may be used and also the meta-phosphates and pyro-phosphates of any of the above metals.

Examples of compositions nucleated with phosphate anions and the method of adding the phosphate are as follows:

(i) Composition No. 1: phosphate added as zinc orthophosphate.
(ii) Composition No. 2: phosphate added as lithium orthophosphate.

The numbers of the compositions refer to the numbers given in the appended Table I.

For compositions containing gold, silver or copper which are introduced as 0.02 to 0.03 percent of gold computed as Au, 0.02 to 0.03 percent of silver computed as AgCl, and 0.5 to 1.0 percent of copper computed as $Cu_2O$ the constituents are added to the batch as follows:

Gold chloride solution
Silver nitrate solution
Cuprous oxide

Composition No. 9, in the appended table, is an example of a composition using gold for nucleation purposes.

The batch compositions when thoroughly mixed, may be melted in crucibles of the fireclay, sillimanite, or high zircon type using either electric melting furnaces or gas-fired melting furnaces.

Where phosphates are used in the glass compositions, the melting furnace atmosphere is not important, as the furnace atmosphere has no effect on the phosphate ions. With the metallic nucleating agents the furnace atmosphere must be controlled as follows:

Gold—oxidising or neutral conditions.
Silver—oxidising or neutral conditions.
Copper—reducing conditions.

The melting temperatures used range from 1200° C. to 1400° C., the melting temperature being so arranged as to enable the glass to be obtained seed and batch free and with a minimum of crucible attack. For example, Composition No. 3 may be melted at 1200° C. whilst Composition No. 9 requires a melting temperature of 1350° C. to 1400° C.

After refining the glasses may be worked by the normal methods employed in glass working, such as casting, drawing and pressing. The samples obtained may then be annealed at a suitable temperature depending on the glass composition. For example, Composition No. 3 would be annealed at 450° C. whilst Composition No. 6 would be annealed at 550° C. Alternatively, the samples may be immediately subjected to the heat-treatment processes as described below.

(b) *Conversion of the glasses into ceramics.*—The glass samples are subjected to heat-treatment processes as described below in order to convert the glasses to ceramic materials.

(i) The articles prepared as described above are heated in a furnace at a rate of 4–5° C. per minute to the "Mg point" of the glass as determined dilatometrically, or, if the samples are to be heat-treated immediately after preparation, they are transferred direct to a furnace maintained at the "Mg point" of the glass. The "Mg point" is related to the point of the maximum expansion of the glass, and has been defined in McMillan et al. pending application Serial No. 90,210. This temperature is maintained for a period of at least one hour and this treatment serves to nucleate the glass and also to initiate the crystallisation processes so that, during subsequent heating, the article is sufficiently refractory to maintain its shape.

(ii) The heating is continued, raising the temperature of the article at 4–5° C. per minute to the final crystallisation temperature which is maintained for at least one hour. This temperature may vary from 800° C. to a temperature in excess of 1000° C. depending on the composition. For example, Composition No. 5 requires heating at 800° C. and Composition No. 7 requires heating to 1000° C. During this stage of the process, crystallisation proceeds rapidly and a dense ceramic product containing closely interlocking crystals is obtained.

On completion of the heat-treatment, the ceramic samples are allowed to cool at the normal cooling rate of the furnace. However, experience has shown that the ceramics will withstand quite rapid rates of cooling. For example, cooling rates as high as 600° C. per hour do not cause fractures.

The ceramic materials formed by controlled devitrification of glass compositions derived from the $$Li_2O—ZnO—SiO_2$$

system are micro-crystalline and may be obtained without deformation occurring during the heat-treatment processes. The types of crystals formed within the ceramics vary with the compositions of the ceramics. The types of crystals which have been shown to be present by means of X-ray diffraction analysis are:

Lithium disilicate, $Li_2O.2SiO_2$
Zinc orthosilicate, $2ZnO.SiO_2$
Alpha cristobalite, $SiO_2$ The ceramics prepared contain one or more of the crystal types listed, depending on the chemical composition, and in addition a glassy phase is present in each case.

Examination of the ceramics by means of the electron microscope has revealed that the crystals range in size from 0.1 to 6.0 microns. They are irregular in shape and are closely interlocked, which makes for a strong, dense material.

The ceramics formed using phosphate ions for nucleation purposes are all white in colour, those using gold are red in colour, those using silver are grey in colour and those using copper are pink in colour.

The ceramics formed by devitrification of glasses of the $Li_2O—ZnO—SiO_2$ system, as described above, have the following properties:

The linear thermal expansion coefficients of the ceramics cover a wide range, since ceramics ranging in thermal expansion coefficient from $42.6 \times 10^{-7}$ to $174.0 \times 10^{-7}$ (20–500° C.) have been prepared.

The refractoriness of the ceramics varies. Some ceramics resist deformation at temperatures up to 800° C. (Composition No. 9), whilst others resist deformation at temperatures in excess of 1000° C. (Composition No. 7).

The mechanical strengths of ceramics derived from glasses of the $Li_2O—ZnO—SiO_2$ system have been shown to be high and values up to 40,000 lb./in.$^2$ have been obtained on rod samples 5 mm. diameter, using a 3-point loading method with a loading length of 1.50 inches, and values up to 90,000 lb./in.$^2$ on rod samples 4 mm. diameter using a 3-point loading method with a loading length of 1.50 cms.

The electrical properties of ceramics derived from glasses of the $Li_2O—ZnO—SiO_2$ system have been shown to be good, values of the dielectric breakdown strength (on D.I.N. type samples, testing thickness 1 mm.) have been obtained within the range 34–50 kv./mm. Values of loss angle in the range $13 \times 10^{-4}$ to $60 \times 10^{-4}$ at a frequency of 1 mc./s. and values of permittivity in the range 5.5 to 6.5 at a frequency of 1 mc./s. have been obtained.

The ceramics have been found to have a high resistance to abrasion, so that any grinding is preferably done in the glassy state. The ceramics can be made to close dimensional tolerances. Very little change in volume occurs in the change from the glass to the ceramic state and grinding of the final ceramic articles is unnecessary.

Ceramics prepared by devitrification of glasses of the $Li_2O—ZnO—SiO_2$ system can be used in many applications. Of particular interest are the following applications, for which the above ceramics are considered to be suitable:

(a) High-tension insulating components and insulating components in general, where an easily shaped ceramic is required, having high mechanical strength combined with satisfactory electrical properties.

(b) Vacuum seal components, for which ceramics of particular thermal expansion coefficients are required to match those of known metals or alloys.

TABLE I

*Weight percentage compositions of selected glass-ceramics*

| Constituents | Composition No. | | | | | | | | |
|---|---|---|---|---|---|---|---|---|---|
| | 1 | 2 | 3 | 4 | 5 | 6 | 7 | 8 | 9 |
| $Li_2O$ | 10.0 | 23.1 | 15.7 | 9.6 | 22.2 | 4.5 | 15.1 | 9.3 | 11.4 |
| ZnO | 27.1 | 15.8 | 28.5 | 39.2 | 30.2 | 48.1 | 41.3 | 50.5 | 14.9 |
| $SiO_2$ | 59.9 | 58.1 | 52.8 | 48.2 | 44.6 | 44.4 | 40.6 | 37.2 | 69.9 |
| $K_2O$ | | | | | | | | | 3.8 |
| $P_2O_5$ | 3.0 | 3.0 | 3.0 | 3.0 | 3.0 | 3.0 | 3.0 | 3.0 | |
| Au | | | | | | | | | .027 |

To further illustrate the present invention the following example is presented as applicable to Composition No. 1 in the above Table I.

The batch materials to give this glass are thoroughly mixed and are then melted at a temperature of 1300° C. in a high zircon type refractory. The glass is refined until seed and batch free, is then worked by normal glass working procedures to form desired shapes, and is then annealed at 480° C. until stress-free.

Articles formed above are heat-treated at a temperature of 500° C. for one hour to nucleate the glass and initiate the crystallisation processes and subsequently at a temperature of 850° C. for 1 hour to complete the crystallisation processes, the heating rates between holding stages being 5° C. per minute and the cooling rate to room temperature being less than 10° C. per minute.

We claim:

1. A ceramic material formed by controlled devitrification of a heat-sensitive glass consisting of major constituents which make up at least 90 percent by weight of the total composition and lie in the system defined by $Li_2O$—2.0 to 27.0 percent, ZnO—10.0 to 59.0 percent, and $SiO_2$—34.0 to 81.0 percent; minor constituents which consist of an oxide of at least one of the metals selected from the group consisting of sodium, potassium, aluminium, magnesium, calcium, barium, lead and boron; and a nucleating agent selected from the group consisting of gold, silver, copper and phosphate ion.

2. A ceramic material as claimed in claim 1, in which the said major constituents lie in the system defined by $Li_2O$—7.0 to 25.0 percent, ZnO—10.0 to 30.0 percent and $SiO_2$—50.0 to 79.0 percent.

3. A ceramic material as claimed in claim 1, in which the said minor constituents include at least one of the substances selected from the group consisting of alkali metal oxides $Na_2O$ and $K_2O$ up to 5 weight percent in total, aluminium oxide $Al_2O_3$ up to 10 weight percent, magnesium oxide MgO up to 10 weight percent, calcium oxide CaO and barium oxide BaO up to 5 weight percent in total, boric oxide $B_2O_3$ up to 10 weight percent, and lead oxide PbO up to 5 weight percent.

4. A ceramic material as claimed in claim 1, in which the nucleating agent is phosphate ion present in such amount that the quantity of phosphate ions introduced into the glass corresponds to 0.5 to 6.0 percent by weight of phosphorus pentoxide.

5. A ceramic material as claimed in claim 1, in which the nucleating agent is 0.02 to 0.03 percent of gold computed as Au.

6. A ceramic material as claimed in claim 1, in which the nucleating agent is 0.02 to 0.03 percent of silver computed as AgCl.

7. A ceramic material as claimed in claim 1, in which the nucleating agent is 0.5 to 1.0 percent of copper computed as $Cu_2O$.

8. A process for manufacturing a ceramic material as claimed in claim 1, consisting essentially of the steps of heating the batch composition to a temperature in the range 1200° C. to 1400° C., allowing the resultant glass to cool, and subsequently heat-treating the glass to bring about its devitrification by maintaining its temperature at the Mg point for a period sufficient to nucleate the glass and to initiate crystallization thereof and subsequently maintaining the temperature at a value between 800° and about 1000° C. until crystallization is completed.

9. A process as claimed in claim 8, consisting essentially of the step of forming a shaped article by a glass-working operation carried out prior to the heat treatment for bringing about devitrification.

References Cited in the file of this patent

UNITED STATES PATENTS

| | | |
|---|---|---|
| 2,219,895 | Hanlein | Oct. 29, 1940 |
| 2,920,971 | Stookey | Jan. 12, 1960 |
| 2,971,853 | Stookey | Feb. 14, 1961 |
| 3,006,775 | Chen | Oct. 31, 1961 |
| 3,063,198 | Babcock | Nov. 13, 1962 |

OTHER REFERENCES

Hinz: Chemical Abstracts, Item 12615c, July 10, 1959, "Vitrokeram."

Eitel et al.: Glastechnische Tabellen, published, 1932, by Springer, Berlin, page 41.